(12) United States Patent
Suzuki (10) Patent No.: US 11,422,387 B2
(45) Date of Patent: Aug. 23, 2022

(54) EYEGLASS LENS, EYEGLASS, AND METHOD FOR PRODUCING EYEGLASS LENS

(71) Applicant: HOYA LENS THAILAND LTD., Pathumthani (TH)

(72) Inventor: Keiichi Suzuki, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 77 days.

(21) Appl. No.: 16/803,642

(22) Filed: Feb. 27, 2020

(65) Prior Publication Data
US 2020/0192120 A1 Jun. 18, 2020

Related U.S. Application Data

(63) Continuation of application No. PCT/JP2019/014001, filed on Mar. 29, 2019.

(30) Foreign Application Priority Data

Mar. 30, 2018 (JP) .............................. JP2018-068059

(51) Int. Cl.
*G02C 7/02* (2006.01)
*G02B 1/14* (2015.01)
(Continued)

(52) U.S. Cl.
CPC ............ *G02C 7/021* (2013.01); *B08B 7/0028* (2013.01); *B08B 7/04* (2013.01); *G02B 1/14* (2015.01); *G02C 2202/16* (2013.01)

(58) Field of Classification Search
CPC ...... G02C 7/021; G02C 2202/16; G02C 7/02; G02C 7/10; G02B 1/14; G02B 1/10;
(Continued)

(56) References Cited

U.S. PATENT DOCUMENTS 3,991,234 A 11/1976 Chang et al.
2004/0095645 A1* 5/2004 Pellicori ................. G09F 13/06
359/584

(Continued)

FOREIGN PATENT DOCUMENTS

CN 101663608 A 3/2010
CN 102749722 A 10/2012
(Continued)

OTHER PUBLICATIONS

Machine Translation of WO-2017018299-A1 (Year: 2017).*
(Continued)

*Primary Examiner* — Darryl J Collins
*Assistant Examiner* — Matthew Y Lee
(74) *Attorney, Agent, or Firm* — Kilpatrick Townsend & Stockton LLP (57) ABSTRACT

Provided is an eyeglass lens having a hard layer on a lens substrate and a pattern layer having a laminate structure in which a plurality of layers are laminated on the hard layer, wherein the pattern layer includes: a metal oxide layer laminated directly on a surface of the hard layer; a metal layer; and a metal oxide layer located at the uppermost surface of the pattern layer.

20 Claims, 8 Drawing Sheets (51) Int. Cl.
B08B 7/00 (2006.01)
B08B 7/04 (2006.01)

(58) Field of Classification Search
CPC ........... G02B 1/111; G02B 1/11; G02B 1/115; G02B 1/116; B08B 7/0028; B08B 7/04
USPC .................................................... 359/159.62
See application file for complete search history.

(56) References Cited

U.S. PATENT DOCUMENTS

| | | | | |
|---|---|---|---|---|
| 2004/0257525 | A1* | 12/2004 | Moravec | G02C 7/105 351/159.62 |
| 2014/0055743 | A1* | 2/2014 | Okubo | G02C 7/021 351/159.69 |
| 2018/0039096 | A1* | 2/2018 | Shioya | G02C 7/022 |

FOREIGN PATENT DOCUMENTS

| | | | | |
|---|---|---|---|---|
| CN | 107407823 | A | 11/2017 | |
| CN | 107664855 | A | 2/2018 | |
| EP | 3255477 | A1 | 12/2017 | |
| JP | H09153462 | A | 6/1997 | |
| JP | 2001074922 | A | 3/2001 | |
| JP | 2002214570 | A | 7/2002 | |
| JP | 2003007674 | * | 1/2003 | ........... H01L 21/302 |
| JP | 2003007674 | A | 1/2003 | |
| JP | 2004526995 | A | 9/2004 | |
| JP | 2008055253 | A | 3/2008 | |
| JP | 2010237637 | A | 10/2010 | |
| WO | 02065171 | A2 | 8/2002 | |
| WO | 2008080020 | A1 | 7/2008 | |
| WO | 2008133136 | A1 | 11/2008 | |
| WO | 2012118089 | A1 | 9/2012 | |
| WO | 2016125808 | A1 | 8/2016 | |
| WO | 2017018299 | A1 | 2/2017 | |
| WO | WO-2017018299 | A1 * | 2/2017 | ................ G03F 7/11 |
| WO | 2018015650 | A1 | 1/2018 | |

OTHER PUBLICATIONS

Machine Translation of JP 2003007674 (Year: 2003).*
PCT/JP2019/014001, "International Search Report and Written Opinion", dated Jun. 25, 2019, 9 pages.
PCT/JP2019/014001, English translation of International Search Report, dated Jun. 25, 2019, 2 pages.
CN201980004238.2, "Office Action" with machine translation, dated Feb. 20, 2021, 15 pages.
JP2018-068059, "Notice of Reasons for Refusal" with machine translation, dated Feb. 24, 2021, 6 pages.
KR10-2020-7005656, "Notification of Reason for Refusal" with machine translation, dated Mar. 10, 2021, 10 pages.
PCT/JP2019/014001, "International Preliminary Report on Patentability", with English translation, dated Oct. 15, 2020, 12 pages.
JP2018-068059, "Notice of Reasons for Refusal" with Machine Translation, dated May 19, 2020, 7 pages.
EP19777815.2 , "Extended European Search Report", dated Jan. 4, 2022, 9 pages.
CN201980004238.2, "Office Action" with Machine Translation, dated Sep. 17, 2021, 22 pages.
JP2018-068059, "Decision of Dismissal" with Machine Translation, dated Oct. 19, 2021, 6 pages.
JP2018-068059, "Decision of Rejection" with Machine Translation, dated Oct. 19, 2021, 2 pages.

* cited by examiner

EYEGLASS LENS, EYEGLASS, AND METHOD FOR PRODUCING EYEGLASS LENS

CROSS-REFERENCE TO RELATED APPLICATIONS

This application is a Continuation of PCT International Application No. PCT/JP2019/014001 filed on Mar. 29, 2019, which was published under PCT Article 21(2) in Japanese. The above application is hereby expressly incorporated by reference, in its entirety, into the present application.

TECHNICAL FIELD

The present disclosure relates to an eyeglass lens, an eyeglass, and a method for producing an eyeglass lens.

BACKGROUND ART

Generally, a variety of types of performance are imparted to an eyeglass lens by providing various functional layers on a lens substrate. Regarding such functional layers, Japanese Patent Application Publication No. 2008-55253, which is expressly incorporated herein by reference in its entirety, discloses providing a semipermeable thin film in a dot shape on a lens surface.

SUMMARY

Japanese Patent Application Publication No. 2008-55253 (paragraph 0014) describes forming the semipermeable thin film (pattern layer) provided in a dot shape by using a metal oxide such as $ZrO_2$.

Meanwhile, a metal layer is suitable as a thin film for controlling light incident through a substrate because a light diffraction effect can be effectively obtained.

A functional layer provided on an eyeglass lens can be exemplified by a hard layer provided directly, or indirectly through a primer or the like, on a lens substrate in order to improve durability of the eyeglass lens. Such a hard layer is generally called a hard coat layer.

In view of the above, the present inventors have studied forming a metal layer as a pattern layer on a lens substrate provided with a hard layer. However, the results of the study have shown that the eyeglass lens produced in such a manner has a problem of a decrease in transmittance due to optical defects such as scratches.

One aspect of the present disclosure provides for an eyeglass lens having a metal pattern layer on a hard layer provided on a lens substrate, wherein the generation of optical defects is suppressed.

One aspect of the present disclosure relates to an eyeglass lens having a hard layer on a lens substrate and having a pattern layer having a laminate structure in which a plurality of layers is laminated on the hard layer, wherein the pattern layer includes: a metal oxide layer laminated directly on a surface of the hard layer; a metal layer; and a metal oxide layer located on the uppermost surface of the pattern layer.

In the eyeglass lens, the pattern layer provided on the hard layer on the lens substrate, includes a metal oxide layer adjacent to the hard layer, and a metal oxide layer located on the uppermost surface of the pattern layer, and also includes a metal layer between these metal oxide layers. The metal oxide layer adjacent to the hard layer can enhance adhesion between the hard layer and the pattern layer, which conceivably contributes to suppressing the occurrence of optical defects due to the peeling of the pattern layer. Furthermore, the metal oxide layer located on the uppermost surface of the pattern layer contributes to preventing deterioration of the metal layer and suppressing the occurrence of scratches on the surface of the pattern layer, which is also presumed to lead to the suppression of the occurrence of optical defects.

According to one embodiment of the present disclosure, it is possible to suppress occurrence of optical defects in an eyeglass lens having a pattern layer including a metal layer on a hard layer provided on a lens substrate.

DESCRIPTION OF EMBODIMENTS

[Eyeglass Lens and Production Method Thereof]

Hereinafter, the eyeglass lens and the production method thereof will be described in more detail. The following description based on the drawings is an exemplification, and the present disclosure is not limited to the illustrated embodiment.

<Configuration of Eyeglass Lens>

Figure 1:
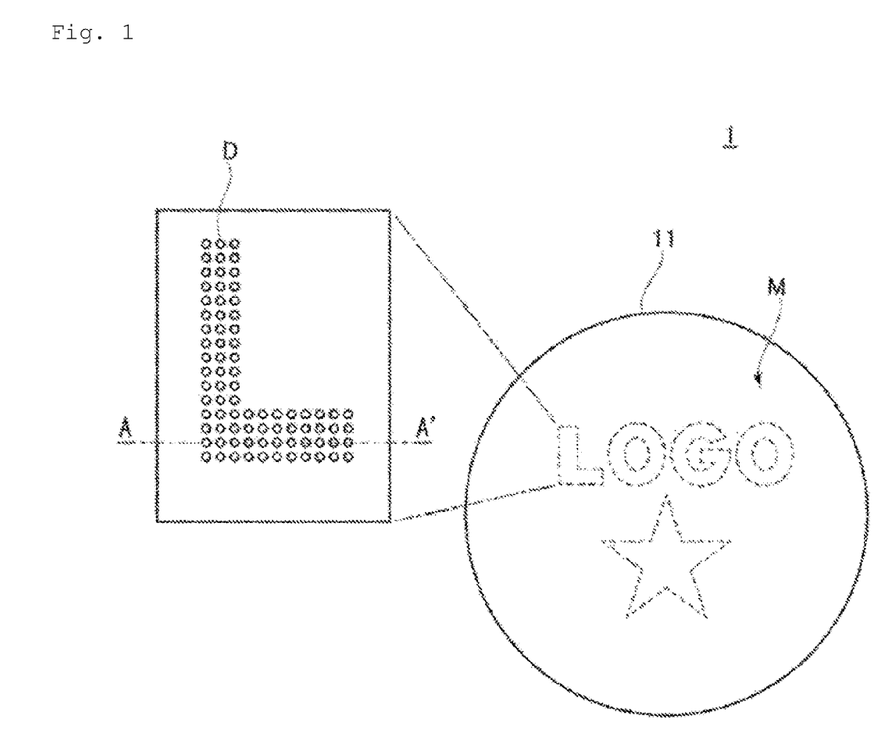
FIG. 1 is a plan view of an eyeglass lens 1.

The eyeglass lens according to one embodiment of the present disclosure has a hard layer on a lens substrate and also has a pattern layer on the surface of the hard layer. A layer continuously provided, without including an opening, on the surface to be covered is a "continuous layer", whereas a "pattern layer" is provided discontinuously and includes an opening on the surface to be covered. FIG. 1 shows a plan view of an example of an eyeglass lens having such a pattern layer.

In the eyeglass lens 1 in FIG. 1, a pattern layer is formed of a plurality of fine dots D, and the dots D form a watermark M. However, the embodiment shown in FIG. 1 is merely an example, and the shape of the pattern layer, the arrangement of the dots, and the like may be determined according to the purpose of providing the pattern layer, and are not limited to the embodiment shown in FIG. 1.

Figure 2:
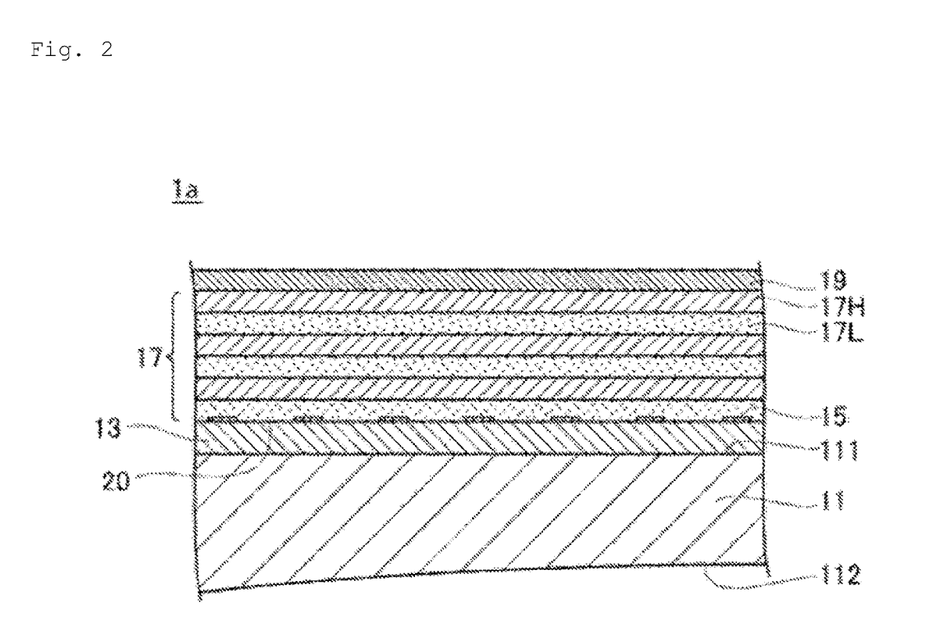
FIG. 2 is a part of an A-A' cross-sectional view of the eyeglass lens 1.

FIG. 2 is a part of an A-A' cross-sectional view of the eyeglass lens 1 in FIG. 1. The eyeglass lens 1 has a lens substrate 11, and has a hard layer 13, a pattern layer 15, an antireflection layer 17, and a water-repellent layer 19 on the surface of the lens substrate 11 in this order. The pattern layer 15 includes a plurality of openings 20 and is provided discontinuously on the surface of the hard layer 13. The configuration of the eyeglass lens illustrated in FIG. 1 is an example, and the eyeglass lens according to one embodiment of the present disclosure may have any configuration provided that it has a hard layer on a lens substrate, and a pattern layer described in detail below on the surface of the hard layer.

Figure 3:
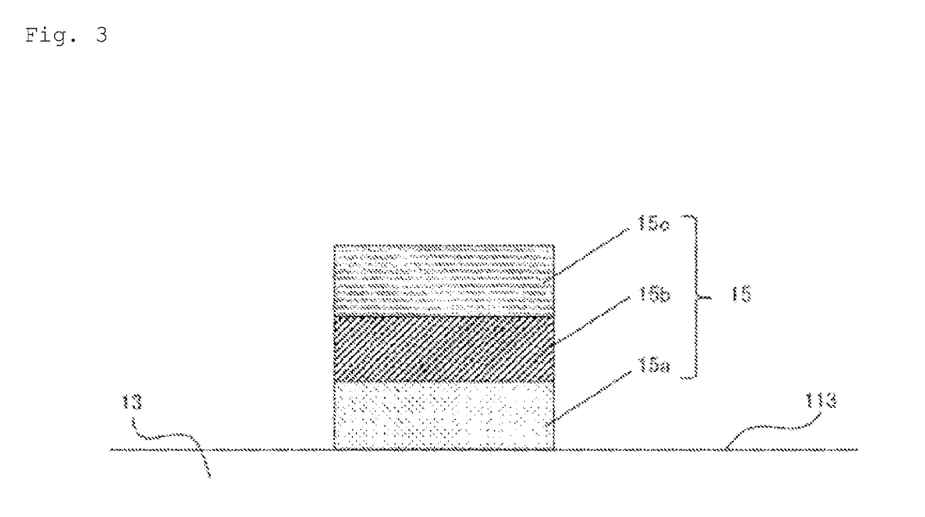
FIG. 3 is a cross-sectional view showing a layer configuration of a pattern layer 15 in the eyeglass lens 1.

Hereinafter, the metal oxide layer directly laminated on the surface of the hard layer is referred to as a "first metal oxide layer", and the metal oxide layer located on the uppermost surface of the pattern layer is referred to as a "second metal oxide layer". FIG. 3 is a cross-sectional view illustrating a layer configuration of the pattern layer 15 in the eyeglass lens 1. In the embodiment shown in FIG. 3, the pattern layer 15 has a three-layer structure configured of a first metal oxide layer 15a directly laminated on a surface 113 of a hard layer 13, a metal layer 15b directly laminated on the surface of the first metal oxide layer 15a, and a second metal oxide layer 15c directly laminated on the surface of the metal layer 15b. However, the pattern layer in the eyeglass lens according to one embodiment of the present disclosure is not limited to the laminated structure of the abovementioned three layers, provided that the layer adjacent to the hard layer and the uppermost surface layer are metal oxide layers, and a metal layer is located between these metal oxide layers. For example, the pattern layer may include two or more metal layers, and also may include one or more metal oxide layers in addition to the first metal oxide layer and the second metal oxide layer. The metal oxide layer can have, for example, a laminated structure of about 3 to 7 layers configured of a metal layer and a metal oxide layer.

Next, each part included (or optionally included) in the eyeglass lens will be described in more detail.

<Lens Substrate>

As the lens substrate, various lens substrates generally used for eyeglass lenses can be used. The lens substrate can be, for example, a plastic lens substrate or a glass lens substrate. The glass lens substrate can be, for example, a lens substrate made of inorganic glass. The lens substrate may be a plastic lens substrate from the viewpoint of being lightweight and difficult to break. Examples of plastic lens substrates include styrene resins such as (meth)acrylic resins, polycarbonate resins, allyl resins, allyl carbonate resins such as diethylene glycol bisallyl carbonate resin (CR-39), vinyl resins, polyester resins, polyether resins, urethanes resin obtained by reacting an isocyanate compound with a hydroxy compound such as diethylene glycol, thiourethane resins obtained by reacting an isocyanate compound with a polythiol compound, and a cured product (generally referred to as a transparent resin) obtained by curing a curable composition including a (thio)epoxy compound having at least one disulfide bond in a molecule. The curable composition can also be referred to as a polymerizable composition. The lens substrate may be an unstained one (colorless lens) or a stained one (stained lens). The refractive index of the lens substrate can be, for example, about 1.60 to 1.75. However, the refractive index of the lens substrate is not limited to the above range, and may be within the above range or may be above or below thereof. In the present disclosure and the present description, the term "refractive index" refers to a refractive index with respect to light having a wavelength of 500 nm. The lens substrate may be a lens having a refractive power (a so-called prescription lens) or a lens having no refraction power (a so-called non-prescription lens).

The eyeglass lens can be various lenses such as a monofocal lens, a multifocal lens, and a progressive-power lens. The type of lens is determined by the surface shape of both surfaces of the lens substrate. In FIG. 1, both surfaces of the object-side surface 111 and the eyeball-side surface 112 are illustrated as planes for the purpose of explanation, but the lens substrate surface may be any of a convex surface, a concave surface, and a plane. In ordinary lens substrates and eyeglass lenses, the object-side surface is convex and the eyeball-side surface is concave. However, the present disclosure is not limited to such a configuration. The "object-side surface" is located on the object side when the eyeglasss provided with eyeglass lenses are worn by a wearer, and the "eyeball-side surface" is located on the opposite side, that is, on the eyeball side when the eyeglasss provided with eyeglass lenses are worn by a wearer.

<Hard Layer>

The eyeglass lens has a hard layer obtained by curing a curable composition between the lens substrate and the pattern layer. The hard layer can be formed using a curable composition for forming various hard layers generally called a hard coat layer. Regarding the hard layer, refer to, for example, paragraphs 0025 to 0028 and 0030 of JP-A-2012-128135. The hard layer can be formed by, for example, applying a curable composition including a silane compound and metal oxide particles directly or indirectly through another layer to the lens substrate surface to form a coating layer, and curing the coating layer (by heating, light irradiation, and the like). Further, a primer layer for improving adhesion may be formed between the lens substrate and the hard layer. For details of the primer layer, refer to, for example, paragraphs 0029 to 0030 of JP-A-2012-128135.

<Pattern Layer>

(Metal Layer)

The eyeglass lens has a pattern layer on the hard layer. This pattern layer includes a metal layer. In the present disclosure and the present description, the "metal layer" means a film formed by deposition by an arbitrary film forming method of a component selected from the group consisting of single metal elements (pure metal) and alloys of a plurality of metal elements (hereinafter, also simply referred to as "metal"), and is a film composed of a metal except for impurities that are unavoidably mixed during film formation and known additives that are optionally used to assist film formation. The metal layer may be a film in which a metal constitutes, for example, 90% by mass to 100% by mass, or a metal constitutes 95% by mass to 100% by mass based on the mass of the film. The metal can be exemplified by a transition element, for example, a chromium group element (for example, chromium (Cr), molybdenum (Mo), and tungsten (W)), an iron group element (for example, iron (Fe), cobalt (Co), and nickel (Ni)) a noble metal element (for example, copper (Cu), silver (Ag), and gold (Au)) and the like. From the viewpoints of transmittance, film stability, availability of materials, and the like, the metal may be a chromium group element, for example, chromium (Cr). That is, the metal layer may be a chromium layer. The thickness of the metal layer is, for example, in the range of 1 nm to 100 nm, or in the range of 1 nm to 50 nm.

(Metal Oxide Layer)

The pattern layer includes a metal layer between the first metal oxide layer adjacent to the hard layer and the uppermost second metal oxide layer. In the present disclosure and the present description, the "metal oxide layer" means a film formed by depositing a metal oxide by an arbitrary film forming method, and is a film composed of a metal oxide except for impurities that are unavoidably mixed during film formation and known additives that are optionally used to assist film formation. The metal layer may be a film in which a metal oxide constitutes, for example, 90% by mass to 100% by mass, or a metal constitutes 95% by mass to 100% by mass based on the mass of the film. The metal oxide can be exemplified by a silicon oxide layer, an aluminum oxide layer, a cerium oxide layer, a chromium oxide layer, a molybdenum oxide layer, a tungsten oxide layer, a zirconium oxide layer, a titanium oxide layer, a niobium oxide layer, a tin oxide layer, a tantalum oxide layer and the like.

The first metal oxide layer is a metal oxide layer directly laminated on the surface of the hard layer, and from the viewpoint of improving the adhesion to the hard layer, it may be a silicon oxide layer. From the viewpoint of improving the adhesion to the hard layer and the transmittance, the thickness of the first metal oxide layer is, for example, in the range of 1 nm to 100 nm, or 1 nm to 50 nm. In one embodiment, the metal layer can be directly laminated on the surface of the first metal oxide layer.

Meanwhile, the second metal oxide layer is located on the uppermost surface of the pattern layer, and in one embodiment, can be a layer directly laminated on the surface of the metal layer. The second metal oxide layer can play a role of protecting the metal layer in the pattern layer, and can also play a role of suppressing the occurrence of scratches on the pattern layer surface. One embodiment of protection of the metal layer includes, for example, oxidation prevention. From the viewpoint of protecting the metal layer and suppressing the occurrence of scratches on the pattern layer surface, the metal oxide layer located on the uppermost surface may be a silicon oxide layer, an aluminum oxide layer, a cerium oxide layer, a chromium oxide layer, a molybdenum oxide layer, a tungsten oxide layer, a zirconium oxide layer, a titanium oxide layer, a niobium oxide layer, a tin oxide layer, or a tantalum oxide layer. From the viewpoints of protection and transmittance of the metal layer, the thickness of the metal oxide layer is, for example, from 1 nm to 100 nm, or from 1 to 50 nm.

The metal oxide constituting the metal oxide layer may be in a stoichiometric composition state, or may be in a state in which oxygen is deficient or excessive with respect to the stoichiometric composition. The same is true for the metal oxide layers in the case where the pattern layer includes one or more metal oxide layers in addition to the first metal oxide layer and the second metal oxide layer.

<Optionally Provided Layers>

The above-mentioned eyeglass lens only needs to include at least the lens substrate, the hard layer and the pattern layer described above, and may optionally include one or more other layers. An example of a layer that can be optionally provided is an antireflection layer.

The anti-reflection layer can be a multilayer film having a laminated structure in which low-refractive-index layers and high-refractive-index layers are alternately laminated. In the present disclosure and the present description, "high" and "low" regarding "high refractive index" and "low refractive index" are relative notations. That is, a high-refractive-index layer refers to a layer having a refractive index higher than that of a low-refractive-index layer included in the same multilayer film. In other words, a low-refractive-index layer refers to a layer having a refractive index lower than that of the high-refractive-index layer included in the same multilayer film. The refractive index of the high-refractive-index material constituting the high-refractive-index layer can be, for example, 1.60 or more (for example, in the range of 1.60 to 2.40), and the refractive index of the low-refractive-index material constituting the low-refractive-index layer can be, for example, 1.59 or less (for example, in the range of 1.37 to 1.59). However, as described above, the terms "high" and "low" regarding the high refractive index and the low refractive index are relative, and the refractive indexes of the high-refractive-index material and the low-refractive-index material are not limited to the above ranges.

Inorganic materials, organic materials, or organic-inorganic composite materials can be used as the high-refractive-index material and the low-refractive-index material. They may be inorganic materials from the viewpoint of film-forming properties and the like. That is, the antireflection layer is, for example, an inorganic multilayer film. Specifically, a high-refractive-index material for forming the high-refractive-index layer can be exemplified by one oxide or a mixture of two or more oxides selected from the group consisting of zirconium oxide (for example, $ZrO_2$), tantalum oxide (for example, $Ta_2O_5$), titanium oxide (for example, $TiO_2$), aluminum oxide (for example, $Al_2O_3$), yttrium oxide (for example, $Y_2O_3$), hafnium oxide (for example, $HfO_2$), and niobium oxide (for example, $Nb_2O_5$). Meanwhile, a low-refractive-index material for forming the low-refractive-index layer can be exemplified by one oxide or fluoride or a mixture of two or more thereof selected from the group consisting of silicon oxide (for example, $SiO_2$), magnesium fluoride (for example, $MgF_2$), and barium fluoride (for example, $BaF_2$). In the above examples, for convenience, oxides and fluorides are represented by stoichiometric compositions, but those in which oxygen or fluorine is deficient or excessive with respect to the stoichiometric composition can be also used as the high-refractive-index materials or low-refractive-index materials.

The high-refractive-index layer may be a film having a high-refractive-index material as a main component, and the low-refractive-index layer is a film having a low-refractive-index material as a main component. Here, the main component is a component that constitutes the largest amount in the film, and is usually a component that constitutes about 50% by mass to 100% by mass, or about 90% by mass to 100% by mass based on the mass of the film. Such a film (for example, a vapor deposited film) can be formed by performing film formation using a film forming material (for example, a vapor deposition source) having the high-refractive-index material or the low-refractive-index material as the main component. The main components relating to the film forming material are the same as above. The film and the film-forming material may include impurities that are unavoidably mixed, and also may include other components, for example, other inorganic substances and known additional components that have a role of assisting in film formation, within a range in which functions of the main component are not impaired. Film formation can be performed by a known film formation method, for example, performed by vapor deposition from the viewpoint of easy film formation. The antireflection layer can be, for example, a multilayer film in which a total of 3 to 10 high-refractive-index layers and low-refractive-index layers are alternately laminated. The thickness of the high-refractive-index layer and the thickness of the low-refractive-index layer can be determined according to the layer configuration. Specifically, the combination of the layers included in the antireflection layer, and the thickness of each layer can be determined by optical simulation using a known method on the basis of the refractive indexes of the film forming material for forming the high-refractive-index layer and the low-refractive-index layer and also the desired reflection characteristics and transmission characteristics which are wished to be imparted to the eyeglass lens by providing the antireflection layer. Further, in the anti-reflection layer, a layer including a conductive oxide as a main component (conductive oxide layer), for example, one or more layers of vapor-deposited films of a conductive oxide formed by vapor deposition using a vapor deposition source including a conductive oxide as a main component, may be included in an arbitrary position of the multilayer film.

Further, layers that can be optionally included in the eyeglass lens can be exemplified by various functional layers such as a water-repellent or hydrophilic antifouling layer and an antifogging layer. Known techniques can be adopted for these functional layers. For example, a water-repellent layer including a fluorine-substituted alkyl group-containing organosilicon compound can be formed as an antifouling layer on the surface of the antireflection layer.

<Method for Producing Eyeglass Lens>

The eyeglass lens according to one embodiment of the present disclosure can be produced through a step of forming a pattern layer by patterning using a resist, and is, for example, produced using a lift-off process.

An example of the method for producing an eyeglass lens according to one embodiment of the present disclosure can be exemplified by a method for producing an eyeglass lens including forming a resist pattern on a surface of a hard layer provided on a lens substrate, and forming a continuous layer having a laminated structure on a surface of the hard layer on which the resist pattern has been formed, the continuous layer having the laminated structure including a continuous layer of a metal oxide directly laminated on the surface of the hard layer on which the resist pattern has been formed, a continuous layer of a metal, and a continuous layer of a metal oxide located on the uppermost surface of the continuous laminated structure, and further including forming the pattern layer by removing the resist pattern after the formation of the continuous layer having the laminated structure, thereby peeling off a portion of the continuous layer having the laminated structure that has been formed on the resist pattern. Hereinafter, the above production method will be described in more detail.

(Hard Layer Forming Step S1)

Figure 4:
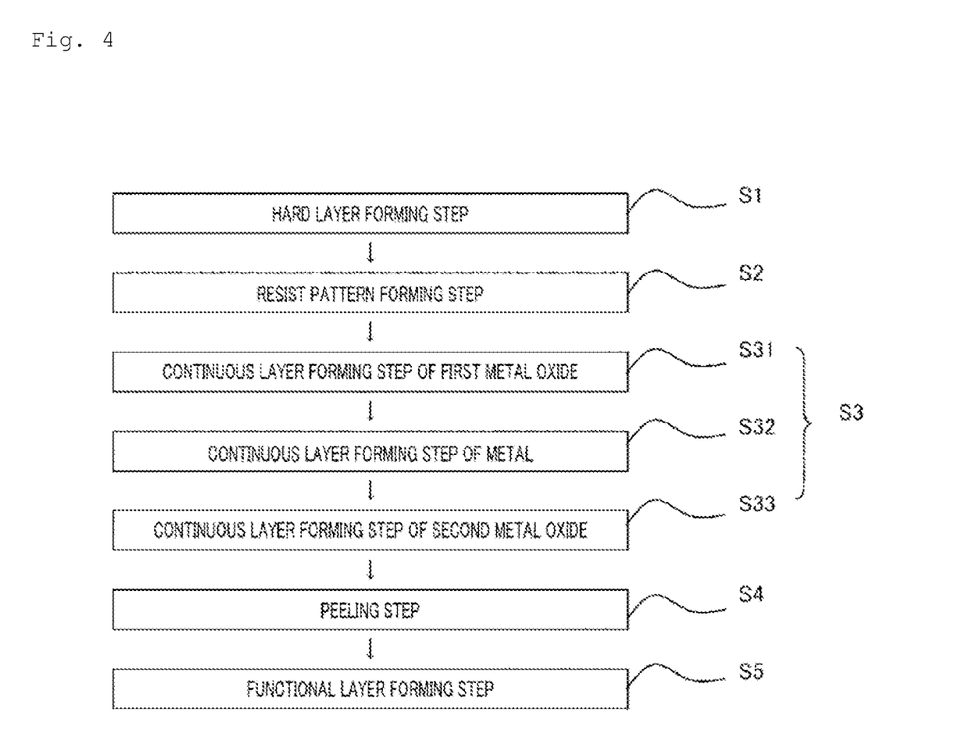
FIG. 4 is a flowchart showing an example of a method for producing the eyeglass lens 1.

FIG. 4 is a flowchart showing an example of a method for producing the eyeglass lens 1. In the hard layer forming step (S1), the hard layer 13 is formed on the lens substrate 11. The hard layer 13 is formed by applying the curable composition to a surface 111 of the lens substrate 11 by a known coating method such as a dipping method to form a coating layer, and curing the formed coating layer by known curing treatment such as heating, light irradiation and the like.

(Resist Pattern Forming Step S2)

Figure 5A:
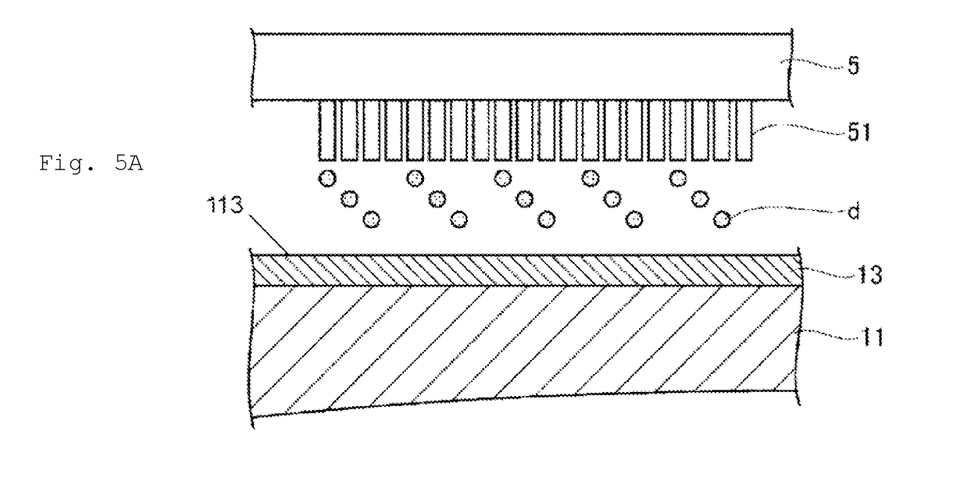
FIGS. 5A-5C show a process chart of a resist pattern forming step (S2).
Figure 5B:
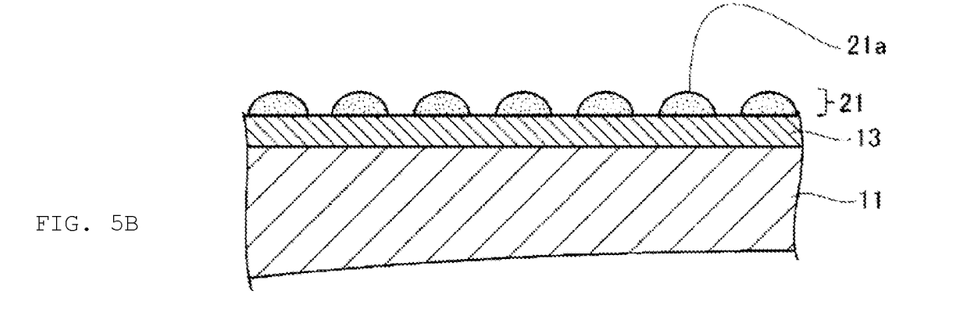
Figure 5C:
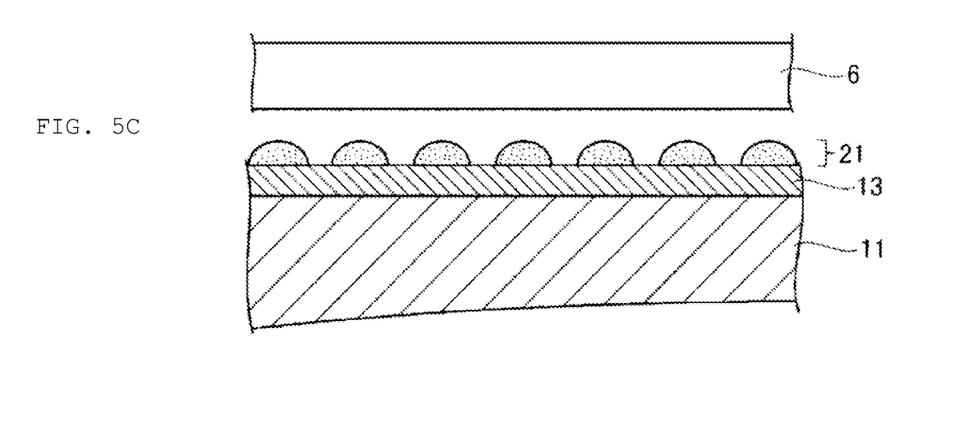

In the resist pattern forming step (S2), a resist pattern is formed on a surface 113 of the hard layer 13 on the lens substrate 11. A process chart of the resist pattern forming step is shown in FIGS. 5A-5C. For example, a resist pattern 21 can be formed by applying ink to the surface 113 of the hard layer 13 in a pattern by an inkjet method using the inkjet apparatus 5. Where the ink is curable, the ink can be cured by performing a curing treatment (for example, light irradiation or heating) according to the type of the ink. By forming the resist pattern in this manner, a part of the hard layer surface is covered with the resist pattern 21 and a part is exposed without being covered with the ink.

A specific embodiment of the resist pattern forming step can be exemplified by the embodiment shown in FIGS. 5A-5C. As shown in FIG. 5A, a plurality of droplets d is ejected from an inkjet nozzle 51. As shown in FIG. 5B, the discharged droplet is combined with another droplet d on the surface 113 of the hard layer 13 to form one dot portion 21a.

In this manner, the dot portions 21a in which the plurality of droplets d are combined are arranged on the surface of the hard layer, thereby forming the resist pattern 21.

After the formation of the resist pattern, as shown in FIG. 5C, the resist pattern 21 is cured by irradiating the resist pattern 21 with light such as ultraviolet rays by using a light irradiation device 6.

From the viewpoint of obtaining excellent curability, the ink may include a (meth)acrylic monomer, and/or may include a water-soluble polymer and a (meth)acrylic monomer. In the present disclosure and the present description, "water-soluble" means a property of dissolving in an amount of 1 g or more in 100 g of water at 25° C.

Examples of the water-soluble polymer include polyvinyl pyrrolidone, polyvinyl alcohol, and polyacrylic acid.

The weight average molecular weight of the water-soluble polymer is, for example, 100 or more, 300 or more, 400 or more, 1000 or more, 5000 or more, or 100,000 or less. From the viewpoint of ink ejection stability in the inkjet method, the weight average molecular weight is, for example, 30,000 or less, or 15,000 or less.

The amount of the water-soluble polymer in the ink is, for example, 1% by mass or more, 2% by mass or more, 3% by mass or more, 30% by mass or less, 20% by mass or less, 10% by mass or less, or 8% by mass or less. From the viewpoint of obtaining excellent curability, the amount is, for example, 5% by mass or less, or 4% by mass or less.

The (meth)acrylic monomer can be exemplified by a monofunctional (meth)acrylate and a polyfunctional (meth)acrylate. Among these, a combination may be a combination of a monofunctional (meth)acrylate and a polyfunctional (meth)acrylate from the viewpoint of curability.

In the present disclosure and the present description, "(meth)acrylic monomer" means at least one selected from the group consisting of an acrylic monomer and a methacrylic monomer, and "(meth)acrylate" means at least one selected from the group consisting of an acrylate and a methacrylate.

Examples of the monofunctional (meth)acrylate include polyethylene glycol mono(meth)acrylates, alkoxy polyethylene glycol mono(meth)acrylates, and the like.

The alkoxy group of the alkoxy polyethylene glycol mono(meth)acrylate may have 1 to 4, 1 to 3, or 1 or 2 carbon atoms.

Examples of the polyethylene glycol mono(meth)acrylate include diethylene glycol mono(meth)acrylate and triethylene glycol mono(meth)acrylate. Examples of the alkoxy polyethylene glycol mono(meth)acrylate include methoxy polyethylene glycol mono(meth)acrylate and ethoxy polyethylene glycol mono(meth)acrylate. Examples of methoxy polyethylene glycol mono(meth)acrylate include methoxy diethylene glycol mono(meth)acrylate and methoxy triethylene glycol mono(meth)acrylate. Examples of ethoxy polyethylene glycol mono(meth)acrylate include ethoxy diethylene glycol mono(meth)acrylate and ethoxy triethylene glycol mono(meth)acrylate.

Among these, from the viewpoint of ink ejection stability in the ink jet method, it may be alkoxy polyethylene glycol mono(meth)acrylates, methoxy polyethylene glycol mono acrylate, or methoxy triethylene glycol mono acrylate.

The polyfunctional (meth)acrylate is, for example, a bifunctional (meth)acrylate. Examples of the bifunctional (meth)acrylate include polyethylene glycol di(meth)acrylate. Among these, it may be polyethylene glycol diacrylate from the viewpoint of curability and the viewpoint of ink ejection stability in an inkjet method. The average number of addition moles of the polyethylene glycol moiety of the polyethylene glycol diacrylate is, for example, 3 or more, 6 or more, 9 or more, 30 or less, 25 or less, or 18 or less.

The amount of the (meth)acrylate in the ink is, for example, 10% by mass or more, 20% by mass or more, 30% by mass or more, 70% by mass or less, 60% by mass or less, or 50% by mass or less.

The amount of the monofunctional (meth)acrylate in the ink is, for example, 10% by mass or more, 20% by mass or more, 30% by mass or more, 70% by mass or less, 60% by mass or less, or 50% by mass or less.

The amount of the polyfunctional (meth)acrylate in the ink is, for example, 1% by mass or more, 3% by mass or more, 5% by mass or more, 30% by mass or less, 20% by mass or less, or 10% by mass or less.

From the viewpoint of curability, the mass ratio of polyfunctional (meth)acrylate/monofunctional (meth)acrylate in the ink is, for example, 5/95 or more, 8/92 or more, 10/90 or more, and is, for example, 40/60 or less, 30/70 or less, or 20/80 or less.

When the curing treatment is performed by light irradiation, the ink may include a photopolymerization initiator. As the photopolymerization initiator, a known photopolymerization initiator, for example, a photopolymerization initiator having two or more hydroxyl groups can be used.

The photopolymerization initiator can be exemplified by 1-[4-(2-hydroxyethoxy)-phenyl]-2-hydroxy-2-methyl-1-propan-1-one.

From the viewpoint of enhancing the curability, the amount of the photopolymerization initiator in the ink is, for example, 1% by mass or more, 3% by mass or more, 5% by mass or more, 30% by mass or less, 20% by mass or less, or 10% by mass or less.

From the viewpoint of curability, the amount of the photopolymerization initiator in the ink is, for example, 5 parts by mass or more, 8 parts by mass or more, 10 parts by mass or more, 40 parts by mass or less, 30 parts by mass or less, or 20 parts by mass or less with the total content of (meth)acrylate as 100 parts by mass.

From the viewpoint of improving the resist pattern formability, the ink may include a high-boiling-point solvent.

The boiling point of the high-boiling-point solvent is, for example, 150° C. or higher, 160° C. or higher, 170° C. or higher, 180° C. or higher, 350° C. or lower, 330° C. or lower, or 300° C. or lower.

Examples of the high-boiling-point solvent include oxyethylene or oxypropylene addition polymers such as diethylene glycol, triethylene glycol, tetraethylene glycol, tripropylene glycol, and the like; diols such as propylene glycol and the like; triols such as glycerin and the like; thiodiglycol; lower alkyl glycol ethers such as ethylene glycol monoethyl ether, triethylene glycol monobutyl ether, and the like; lower dialkyl glycol ethers such as triethylene glycol diethyl ether, tetraethylene glycol dimethyl ether, tetraethylene glycol diethyl ether, and the like; and the like. These can be used alone or in combination of two or more. It may be propylene glycol.

The amount of the high-boiling point solvent in the ink is, for example, 5% by mass or more, 10% by mass or more, 15% by mass or more, 40% by mass or less, 30% by mass or less, or 20% by mass or less.

The ink can include water from the viewpoint of viscosity adjustment.

Examples of the water include tap water, pure water, ion-exchanged water, and the like.

The water amount of the ink is, for example, 10% by mass or more, 20% by mass or more, 30% by mass or more, 80% by mass or less, 70% by mass or less, or 60% by mass or less.

From the viewpoint of suitability for the ink jet method, the viscosity of the ink is, for example, 1 mPa·s or more, 5 mPa·s or more, 8 mPa·s or more, 40 mPa·s or less, 30 mPa·s or less, 20 mPa·s or less, or 15 mPa·s or less.

The pH of the ink is, for example, 3.0 or higher, 3.5 or higher, or 4.0 or higher, and is, for example, 12 or lower, 11 or lower, or 10 or lower.

From the viewpoint of making the dot shape of the resist pattern closer to a perfect circle, the contact angle of the ink with the surface 113 of the hard layer is, for example, 25° or more, 30° or more, 45° or more, 65° or less, 60° or less, 55° or less, or 53° or less. The contact angle is a value measured by a static drop method according to JIS R 3257:1990.

The type and system of the inkjet method are not limited, and may be a continuous type or an on-demand type, and the on-demand type may be a piezo type or a thermal type.

The resist pattern 21 has dot portions 21a corresponding to openings 20 formed on the surface 113 of the hard layer 13. A continuous layer having a laminated structure is formed on the surface 113 of the hard layer 13 on which the dot portions 21a have thus been formed. Hereinafter, the continuous layer having a laminated structure is also referred to as a continuous laminated structure.

The distance AD from the center of the dot portion 21a to the center of the adjacent dot portion 21a is, for example, 0.1 mm or more, 0.2 mm or more, or 0.3 mm or more, and for example, 5.0 mm or less, 3.0 mm or less, or 1.0 mm or less.

The dot diameter DD is, for example, 0.01 mm or more, 0.05 mm or more, or 0.1 mm or more, and for example, 5.0 mm or less, 2.0 mm or less, 1.0 mm or less, or 0.5 mm or less.

The distance AD/diameter DD ratio is, for example, more than 1.0, 1.1 or more, or 1.2 or more, and is, for example, 2.0 or less, 1.8 or less, or 1.5 or less.

From the viewpoint of improving the resist pattern formability, the dot density of the dots formed by the inkjet method is, for example, 300 dpi (dots per inch) or more, 400 dpi or more, or 500 dpi or more, and is, for example, 1000 dpi or less, 900 dpi or less, or 800 dpi or less.

From the viewpoint of improving the curability of the formed dots and improving the resist pattern formability, the amount of ink discharged per dot is, for example, 600 pl (picolitre) or more, 1000 pl or more, or 2000 pl or more, and is, for example, 6000 pl or less, 5000 pl or less, or 4000 pl or less.

(Continuous Laminated Structure Forming Step S3)

In the continuous laminated structure forming step (S3), a continuous layer 22 having a laminated structure is formed on the surface 113 of the hard layer 13 on which the resist pattern 21 has been formed. The continuous layer 22 having a laminated structure is configured of a continuous layer of a first metal oxide, a continuous layer of a metal, and a continuous layer of a second metal oxide. Regarding the metal of the continuous layer, the above description relating to the metal layer can be referred to. Regarding the first metal oxide, the above description relating to the first metal oxide layer can be referred to, and regarding the second metal oxide, the above description of the second metal oxide layer can be referred to. In the embodiment shown in FIG. 4, a pattern layer configured of a first metal oxide layer, a metal layer, and a second metal oxide layer is formed. However, as described above, the pattern layer included in the eyeglass lens is not limited to such a layer configuration.

Figure 6:
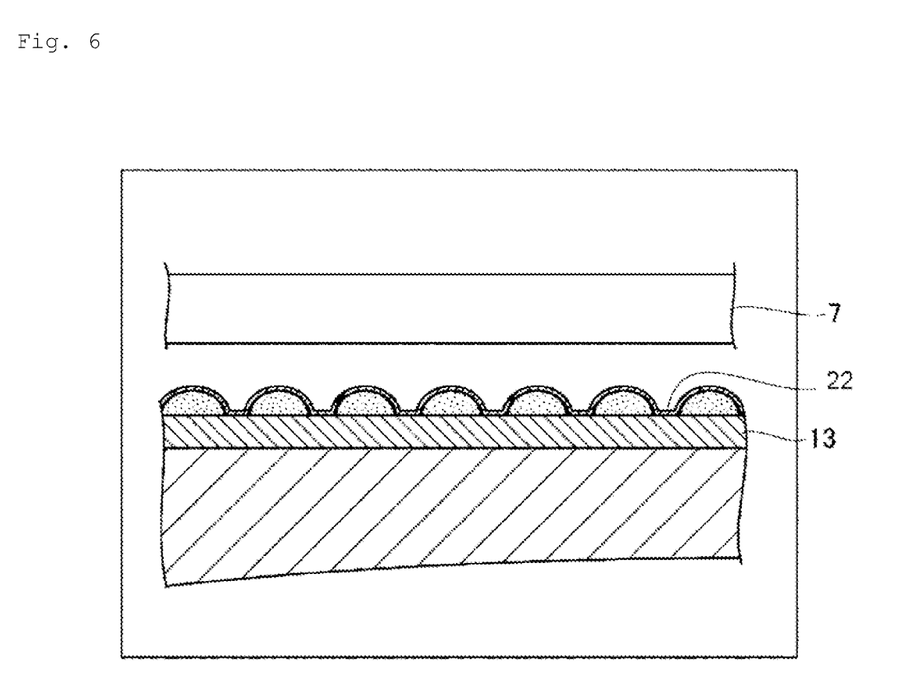
FIG. 6 is a schematic view of a step (S3) of forming a continuous layer 22 having a laminated structure.

The formation of each continuous layer (steps S31, S32 and S33) can be performed by a known film forming method. The formation of each continuous layer can be performed by vapor deposition. For example, as shown in FIG. 6, a continuous layer 22 having a laminated structure can be formed by the vapor deposition device 7 so as to cover the resist pattern 21 and the opening 20 provided on the surface 113 of the hard layer 13. The term "vapor deposition" in the present disclosure and the present description is inclusive of a vacuum vapor deposition method, an ion plating method, a sputtering method and the like. In the vacuum vapor deposition method, an ion assist method (ion assisted vapor deposition) in which an ion beam is simultaneously radiated during the vapor deposition may be used.

(Peeling Step S4)

Figure 7:
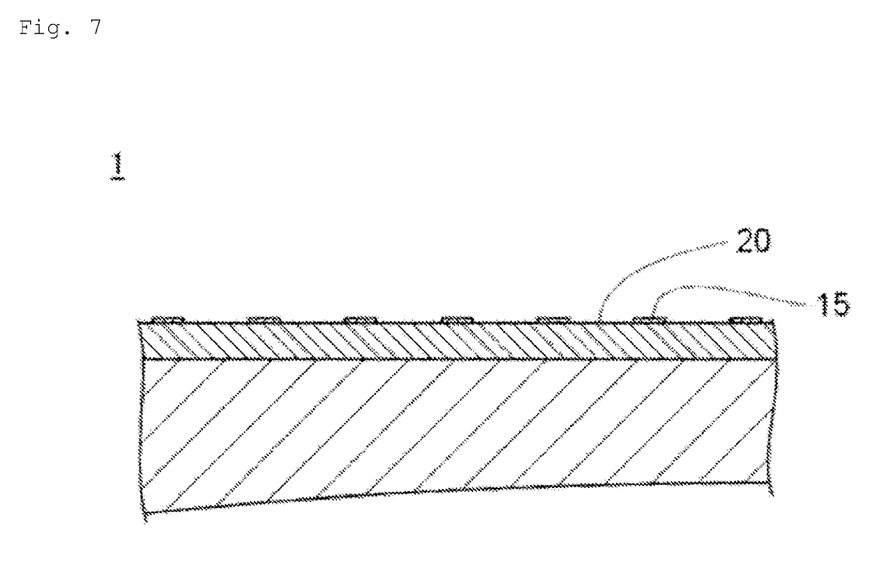
FIG. 7 is a part of a cross-sectional view of the eyeglass lens 1 after a peeling step (S4).

After the formation of the continuous layer 22 having the above-described laminated structure, the resist pattern 21 is peeled off in the peeling step (S4), so that the resist pattern 21 and a portion of the continuous layer 22 having the laminated structure which has been formed on the resist pattern 21 could be peeled off and removed (lift-off). Thereby, as shown in FIG. 7, a pattern layer 15 having a plurality of openings 20 can be formed on the surface 113 of the hard layer 13.

Removal of the resist pattern in the peeling step can be performed by physical peeling and/or chemical peeling. "Physical peeling" refers to removing a peeling target by applying an external force. Meanwhile, removal by subjecting the object to be peeled to chemical deterioration with a solvent or a chemical solution is "chemical peeling". The peeling step may be performed by physical peeling, may be performed by chemical peeling, may be performed by combining physical peeling and chemical peeling, and may be performed by physical peeling while using a solvent or a chemical solution for chemical peeling. Where the resist pattern is removed by physical peeling after forming a continuous layer (single layer) of metal on the resist pattern, scratches can occur on the surface of a portion that remains after the peeling step and becomes the pattern layer, or a part of the surface can be peeled off. Further, where the resist pattern is removed by chemical peeling after forming a continuous layer (single layer) of metal on the resist pattern, the surface of a portion that remains after the peeling step and becomes the pattern layer can be deteriorated or partially peeled. The abovementioned scratches, deterioration and partial peeling become optical defects of the eyeglass lens and cause the optical characteristics of the eyeglass lens to deviate from target values. Meanwhile, the inventors infer that since the uppermost surface of the continuous layer having a laminated structure is a metal oxide layer, the uppermost surface is less likely to be scratched in physical peeling and less likely to deteriorate in chemical peeling than in the case where the uppermost surface is a metal layer. In addition, the present inventors believe that since the continuous layer having the laminated structure has excellent adhesion with the hard layer because the layer adjacent to the hard layer is a metal oxide layer, partial peeling is less likely to occur in physical peeling or chemical peeling as compared to the case where a metal layer is adjacent to the hard layer. The present inventors infer that the above-described feature contributes to suppressing the occurrence of optical defects.

Physical peeling can be performed, for example, by rubbing the resist pattern (that is, the convex portion) 21 with a solid sliding material. As a result, the portion formed on the resist pattern 21 of the continuous layer having the laminated structure can be removed together with the resist pattern 21. By partially removing the continuous layer 22 having the laminated structure in this manner, it is possible to form the pattern layer 15 having the plurality of openings 20 on the surface 113 of the hard layer 13.

The "solid sliding material" refers to a solid material that removes the object to be treated by the operation such as polishing. Examples of the solid rubbing material include a foam, an elastomer, a cloth, a polishing pad, or a brush. Examples of the foam include a melamine resin foam, a urethane resin foam, and the like. Examples of the elastomer include rubber and urethane elastomer. The cloth may be any of a non-woven cloth and a woven cloth. The solid rubbing material may be a foam, for example, a melamine resin foam. The solid sliding material may have any shape, for example, a sheet, a glove, or the like.

The physical peeling may be performed under a dry condition or a wet condition. In the case of physical peeling, peeling debris is usually generated, but where the physical peeling is performed under dry conditions, the peeling debris can be generated in a dry state. The dried debris can be easily removed by an adhesive tape, air blow or the like.

Figure 8:
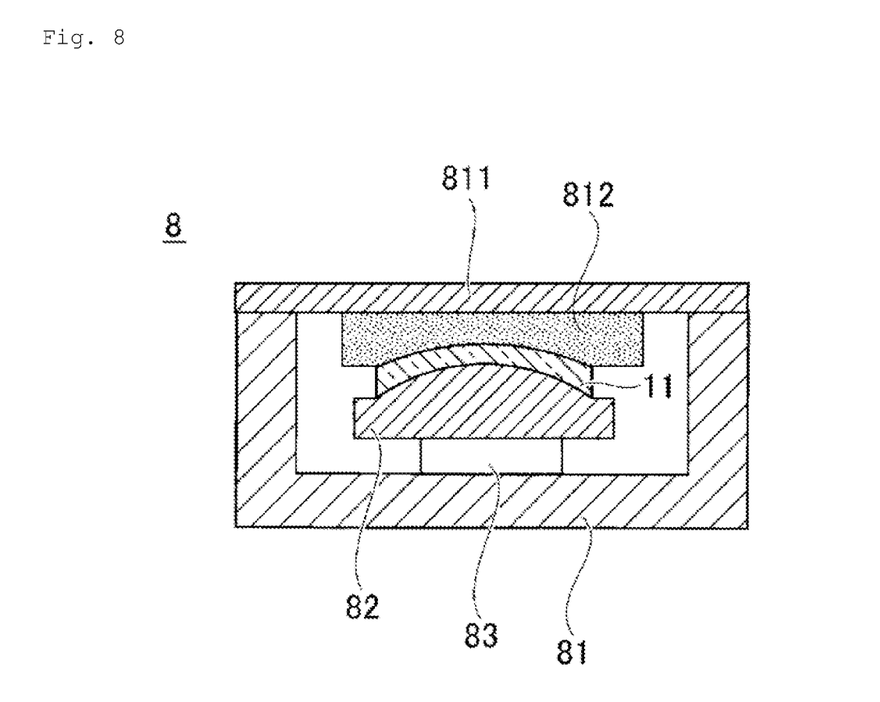
FIG. 8 is a schematic view of a processing apparatus 8 that can be used in a peeling step (S4).

In one embodiment, the physical separation can be performed by rotating an object to be brought into contact with the solid sliding material. FIG. 8 is a schematic diagram illustrating an example of the processing apparatus 8 for performing physical peeling. In the physical peeling, for example, as shown in FIG. 8, the lens substrate 11 on which the hard layer 13, the resist pattern 21, and the continuous layer 22 having a laminated structure have been formed is held on a stage 82 of the processing apparatus 8. Then, the lens substrate 11 is rotated and a solid sliding material 812 is brought into contact therewith under dry conditions.

As shown in FIG. 8, the processing apparatus 8 includes a chamber 81 having a lid 811 on an upper part, a stage 82 installed in the chamber 81 and holding the lens substrate 11, and a motor 83 for rotating the stage 82.

The lid 811 has a solid sliding material 812 on the inner surface side of the chamber 81, and when the chamber 81 is closed by the lid 811, the lid 811 comes into contact with the lens substrate 11 held on the stage 82.

As shown in FIG. 8, in the physical peeling, the lens substrate 11 is placed on the stage 82, the stage 82 is rotated, and the solid sliding material 812 is brought into contact under a dry condition. As a result, a resist pattern (convex portion) 21 is rubbed through the continuous layer 22 having a laminated structure formed thereon, and a portion of the continuous layer 22 formed on the resist pattern 21 is removed together with the resist pattern 21. As shown in FIG. 7, the eyeglass lens 1 on which the pattern layer 15 having the openings 20 is formed is thus obtained. Regarding the rotation, the lens substrate 11 may be rotated as described above, the solid sliding material 812 may be rotated, or the lens substrate 11 and the solid sliding material 812 may be rotated.

In the physical peeling, peeling debris originating from the peeled resist pattern 21 or a portion of the continuous layer 22 having a laminated structure formed on the resist pattern is generated and may adhere to the eyeglass lens surface. Such debris can be removed with an adhesive tape, air blow or the like.

Furthermore, washing can be performed before or after removing the above-mentioned debris. Washing can be performed using, for example, an aqueous solvent. In one embodiment, the washing can be performed with water. Alternatively, physical peeling can be performed under wet conditions instead of, or before or after the washing. For physical peeling under wet conditions, for example, a solid sliding material including an aqueous solvent can be used. The aqueous solvent means a solvent including 60% by mass or more of water. The aqueous solvent may be water. Examples of suitable aqueous solvents other than water include alcohol-based solvents such as ethanol, methanol, propanol, and the like and ketone-based solvents such as acetone, methyl ethyl ketone, and the like. The amount of water in the aqueous solvent is, for example, 80% by mass or more, 90% by mass or more, 95% by mass or more, or 100% by mass. By the physical peeling under the wet condition, the resist pattern can be prevented from remaining, and the resist pattern can be peeled more reliably.

(Functional Layer Forming Step S5)

In the mode shown in the flow chart of FIG. 4, after the above-described peeling step, a functional layer is formed in the functional layer forming step (S5). In the case of obtaining the eyeglass lens having the configuration shown in FIG. 2, in the functional layer forming step, an antireflection layer 17 in which low-refractive-index layers 17L and high-refractive-index layers 17H are alternately laminated is formed. A water-repellent layer 19 is formed on the antireflection layer 17.

In the functional layer forming step, a surface treatment can be performed on the surface on which the functional layer is to be formed. As this surface treatment, surface cleaning can be mentioned, and as a specific example, ion cleaning can be mentioned. By the ion cleaning, organic substances adhered to the surface on which the functional layer is to be formed can be removed to clean the surface. The ion cleaning is a process of irradiating a treatment surface with ions by an ion gun (IG; Ion gun). From the viewpoint of cleaning properties, the ions to be used for the irradiation may be oxygen ions. The surface of the pattern layer is also irradiated with ions by ion cleaning, but since the metal oxide layer is located on the uppermost surface of the pattern layer, oxidation of the pattern layer by oxygen ions is less likely to occur, and the change in transmittance caused by oxidation can be suppressed. The surface cleaning may be performed using an inactive gas, for example, an argon (Ar) gas, a xenon (Xe) gas, or a nitrogen ($N_2$) gas, or may be performed by irradiating with oxygen radicals or oxygen plasma.

In the functional layer forming step, one or more of the various layers described above as layers that can be optionally provided on the eyeglass lens can be formed on the surface of the hard layer having the pattern layer.

[Eyeglasss]

Another aspect of the present disclosure relates to eyeglasss provided with the above eyeglass lens. The details of the eyeglass lens included in the eyeglasss are as described above. The configuration of the eyeglasss such as a frame is not particularly limited, and a known technique can be adopted.

EXAMPLES

Hereinafter, the present disclosure will be further described with reference to examples. However, the present disclosure is not limited to the embodiments shown in the examples.

Example 1

1. Hard Layer Forming Step

A curable composition including a silane compound and metal oxide particles (hard coat liquid manufactured by HOYA CORPORATION (trade name: HC60S)) was coated on the object-side surface (convex surface) of an eyeglass lens substrate produced using an eyeglass lens monomer (MR8 manufactured by Mitsui Chemicals, Inc.) to form a coating layer, and the coating layer was cured by heating to provide a hard coat layer (hard layer).

2. Resist Pattern Forming Process (Preparation of Ink)

A total of 5 parts by mass of polyethylene glycol diacrylate (average number of added moles 14, CAS No. 26570-48-9), 35 parts by mass of methoxytriethylene glycol acrylate (CAS No. 48067-72-7), and 16 parts by mass of water were placed in a sample bottle and stirred. Thereafter, 18 parts by mass of propylene glycol was added, and the mixture was further stirred. Further, a 1% by mass aqueous solution of NaOH was added to adjust the pH. Thereafter, 5 parts by mass of 1-[4-(2-hydroxyethoxy)-phenyl]-2-hydroxy-2-methyl-1-propan-1-one (CAS No. 106797-53-9) was further added as a photopolymerization initiator followed by stirring, 17.5 parts by mass of a 20% by mass aqueous solution of polyvinylpyrrolidone (weight average molecular weight 10,000, CAS No. 9003-39-8) was added followed by stirring, and insolubles were removed with a filter ring, to obtain ink having a pH of 7. The obtained ink had a viscosity of 14.5 mPa·s and a contact angle of 50°.

The pH of the ink was measured by a glass electrode method using a pH meter (F-55, manufactured by Horiba, Ltd.) at a temperature of 25° C.

The viscosity of the ink was measured by a tuning fork vibrating viscometer (SV-10 manufactured by A&D Co., Ltd.) under the condition of a temperature of 25° C. in accordance with JIS Z 8803:2011.

The contact angle was measured by the method described in the 6. Static Drop Method section of JIS R 3257:1990 by dropping the ink onto the surface of the hard coat layer formed on the eyeglasss lens substrate in the same manner as in the above-described hard layer forming step.

(Formation of Resist Pattern)

The ink prepared as described hereinabove was applied to the entire surface of the hard coat layer, which was formed as described in the section 1 hereinabove, in the form of grid-like dots having a dot diameter of 0.323 nm and a dot interval of 0.432 nm by using an ink jet apparatus equipped with a nozzle (KJ4A manufactured by Kyocera Corporation). The printing width was 108 mm and the dot density was 9600×600 dpi. The number of droplets per dot was 2400 pl. After the formation of the resist pattern, the resist pattern was formed by curing the ink by irradiation with ultraviolet rays with an ultraviolet irradiation apparatus (UVX-01212S1CS01 manufactured by USHIO INC.). The resist pattern could be formed as circular dots without lattice defects.

3. Continuous Laminated Structure Forming Process

After the above curing, the surface of the hard coat layer was subjected to ion cleaning with oxygen ions in a vacuum vapor deposition apparatus. The processing conditions of the ion cleaning were an acceleration voltage of 350 V, a current of 180 mA, an $O_2$ introduction flow rate of 10 sccm, an Ar introduction flow rate of 10 sccm, and a processing time of 45 sec. Subsequently, a silicon oxide layer was vapor deposited (Emi. Current: 155 mA), a chromium layer was further vapor deposited as a metal layer (Emi. Current: 38 mA), and a silicon oxide layer was further vapor deposited (Emi. Current: 155 mA) to form a continuous laminated structure in which a silicon oxide layer (continuous layer), a chromium layer (continuous layer), and a silicon oxide layer (continuous layer) were laminated in this order.

4. Peeling Step

The eyeglass lens substrate having the continuous laminated structure formed thereon in the section 3 hereinabove was placed on the stage 82 of the processing apparatus 8 shown in FIG. 8 and rotated, and a melamine resin foam 812 was pressed against the surface thereof under a dry condition for 5 sec to perform physical peeling. Thereafter, the rotation was stopped, and peeling debris adhering to the surface on which physical peeling was performed were removed with an adhesive tape. Subsequently, the surface was washed with water and dried.

Thus, a three-layer pattern layer composed of a first metal oxide layer (a silicon oxide layer having a thickness of 10 nm), a metal layer (a chromium layer having a thickness of 10 nm) and a second metal oxide layer (a silicon oxide layer having a thickness of 10 nm) was formed on the surface of the hard coat layer formed on the eyeglass lens substrate.

Example 2

A three-layer pattern layer composed of a first metal oxide layer (a silicon oxide layer having a thickness of 10 nm), a metal layer (a chromium layer having a thickness of 10 nm) and a second metal oxide layer (a silicon oxide layer having a thickness of 10 nm) was formed on the surface of the hard coat layer formed on the eyeglass lens substrate in the same manner as in Example 1 except that the peeling step was performed by rotating on the stage 82 of the eyeglass lens substrate processing apparatus 8 after the above-mentioned peeling debris was removed, pressing the melamine resin foam 812 impregnated with water against the surface, and finally blowing the air and drying.

When the pattern layer of each of the eyeglass lenses of Examples 1 and 2 was observed with an optical microscope, no scratch or deterioration was confirmed on the surface of the pattern layer, and no partial peeling of the pattern layer was observed.

Each of the eyeglass lenses of Examples 1 and 2 was placed in a vacuum vapor deposition apparatus, and the surface of the hard coat layer on which the pattern layer was formed was subjected to ion cleaning with oxygen ions in the apparatus. The processing conditions of the ion cleaning were an acceleration voltage of 350 V, an acceleration current of 180 mA, an $O_2$ introduction flow rate of 10 sccm, an Ar introduction flow rate of 10 sccm, and a processing time of 45 sec.

Before and after ion cleaning, the average transmittance at a wavelength of 380 nm to 780 nm was determined, and the visible light transmittance change rate was calculated as "{(average transmittance after ion cleaning)−(average transmittance before ion cleaning)}/(average transmittance before ion cleaning)×100". In each of the eyeglass lenses of Examples 1 and 2, the visible light transmittance change rate was 0.5% or less, and it was confirmed that the transmittance change due to oxidation of the pattern layer was suppressed.

Comparative Example 1

A pattern layer composed of a single layer, namely, a metal layer (a chromium layer having a thickness of 10 nm) was formed on the surface of the hard coat layer formed on the eyeglass lens substrate in the same manner as in Example 1, except that only a chromium layer was formed as a continuous layer in the section 3 hereinabove.

When the pattern layer of the eyeglass lens of Comparative Example 1 was observed with an optical microscope, scratches on the pattern layer surface and partial peeling of the pattern layer were observed. These optical defects (scratches and partial peeling) cause a change in the visible light transmittance of the eyeglass lens.

Comparative Example 2

A pattern layer composed of two layers, namely, a metal oxide layer (a silicon oxide layer having a thickness of 10 nm) and a metal layer (a chromium layer having a thickness of 10 nm) was formed on the surface of the hard coat layer formed on the eyeglass lens substrate in the same manner as in Example 1, except that vapor deposition of a silicon oxide layer on the chromium layer was not performed in the section 3 hereinabove.

When the pattern layer of the eyeglass lens of Comparative Example 2 was observed with an optical microscope, scratches were observed on the pattern layer surface. This optical defect (scratches) causes a change in the visible light transmittance of the eyeglass lens.

Lastly, the above-mentioned embodiments are summarized.

According to one embodiment, there is provided an eyeglass lens having a hard layer on a lens substrate, and having a pattern layer having a laminated structure in which a plurality of layers is laminated on the hard layer, wherein the pattern layer includes a metal oxide layer directly laminated on a surface of the hard layer, a metal layer, and a metal oxide layer located on an uppermost surface of the pattern layer.

The eyeglass lens has the pattern layer including the metal layer on the hard layer provided on the lens substrate, and the occurrence of optical defects can be suppressed.

In one embodiment, the pattern layer can be configured of a metal oxide layer directly laminated on the surface of the hard layer, a metal layer directly laminated on a surface of the metal oxide layer, and a metal oxide directly laminated on a surface of the metal layer.

In one embodiment, the metal layer can be a metal layer selected from the group consisting of a chromium layer, a molybdenum layer, a tungsten layer, an iron layer, a cobalt layer, a nickel layer, a copper layer, a silver layer, and a gold layer.

In one embodiment, the metal oxide layer directly laminated on the surface of the hard layer can be a metal oxide layer selected from the group consisting of a silicon oxide layer, an aluminum oxide layer, a cerium oxide layer, a chromium oxide layer, a molybdenum oxide layer, a tungsten oxide layer, a zirconium oxide layer, a titanium oxide layer, a niobium oxide layer, a tin oxide layer, and a tantalum oxide layer.

In one embodiment, a thickness of the metal oxide layer directly laminated on the surface of the hard layer can be in the range of 1 nm to 100 nm.

In one embodiment, the metal oxide layer located on the uppermost surface of the pattern layer can be a metal oxide layer selected from the group consisting of a silicon oxide layer, an aluminum oxide layer, a cerium oxide layer, a chromium oxide layer, a molybdenum oxide layer, a tungsten oxide layer, a zirconium oxide layer, a titanium oxide layer, a niobium oxide layer, a tin oxide layer, and a tantalum oxide layer.

In one embodiment, a thickness of the metal oxide layer located on the uppermost surface of the pattern layer is in the range of 1 nm to 100 nm.

In one embodiment, there is provided an eyeglass comprising the abovementioned eyeglass lens.

In one embodiment, there is provided a method for producing the abovementioned eyeglass lens, including forming a resist pattern on a surface of a hard layer provided on a lens substrate, and forming a continuous layer having a laminated structure on a surface of the hard layer on which the resist pattern has been formed, the continuous layer having the laminated structure including a continuous layer of a metal oxide directly laminated on the surface of the hard layer on which the resist pattern has been formed, a continuous layer of a metal, and a continuous layer of a metal oxide located on the uppermost surface of the continuous laminated structure, and further including forming the pattern layer by removing the resist pattern after the formation of the continuous layer having the laminated structure, thereby peeling off a portion of the continuous layer having the laminated structure that has been formed on the resist pattern.

In one embodiment, removing the resist pattern can include physical peeling.

In one embodiment the production method can include performing ion cleaning with oxygen ions on the surface of the hard layer on which the pattern layer has been formed.

Various embodiments described in this specification can be combined in any combination of two or more.

The embodiments disclosed this time are to be considered in all respects as illustrative and not restrictive. The scope of the present disclosure is defined by the terms of the claims, rather than the description above, and is intended to be inclusive of any modifications within the scope and meaning equivalent to the terms of the claims.

What is claimed is:

1. An eyeglass lens,
having a hard layer on a lens substrate, and
having a pattern layer having a laminated structure in which a plurality of layers is laminated on the hard layer, wherein
the pattern layer includes a first metal oxide layer directly laminated on a surface of the hard layer, a metal layer, and a second metal oxide layer located as an uppermost surface layer of the pattern layer, and
the pattern layer is discontinuous and includes at least one opening to the surface of the hard layer.

2. The eyeglass lens according to claim 1,
wherein the pattern layer is configured of the first metal oxide layer directly laminated on the surface of the hard layer, a metal layer directly laminated on a surface of the first metal oxide layer directly laminated on the surface of the hard layer, and the second metal oxide directly laminated on a surface of the metal layer directly laminated on the surface of the first metal oxide layer.

3. The eyeglass lens according to claim 1,
wherein the metal layer is a metal layer selected from the group consisting of a chromium layer, a molybdenum layer, a tungsten layer, an iron layer, a cobalt layer, a nickel layer, a copper layer, a silver layer, and a gold layer.

4. The eyeglass lens according to claim 1,
wherein the first metal oxide layer directly laminated on the surface of the hard layer is a metal oxide layer selected from the group consisting of a silicon oxide layer, an aluminum oxide layer, a cerium oxide layer, a chromium oxide layer, a molybdenum oxide layer, a tungsten oxide layer, a zirconium oxide layer, a titanium oxide layer, a niobium oxide layer, a tin oxide layer, and a tantalum oxide layer.

5. The eyeglass lens according to claim 1,
wherein a thickness of the first metal oxide layer directly laminated on the surface of the hard layer is in the range of 1 nm to 100 nm.

6. The eyeglass lens according to claim 1,
wherein the metal oxide layer located on the uppermost surface of the pattern layer is a metal oxide layer selected from the group consisting of a silicon oxide layer, an aluminum oxide layer, a cerium oxide layer, a chromium oxide layer, a molybdenum oxide layer, a tungsten oxide layer, a zirconium oxide layer, a titanium oxide layer, a niobium oxide layer, a tin oxide layer, and a tantalum oxide layer.

7. The eyeglass lens according to claim 1,
wherein a thickness of the second metal oxide layer located on the uppermost surface of the pattern layer is in the range of 1 nm to 100 nm.

8. An eyeglass comprising the eyeglass lens according to claim 1.

9. A method for producing an eyeglass lens,
wherein the eyeglass lens is the eyeglass lens according to claim 1, and
the method including
forming a resist pattern on a surface of a hard layer provided on a lens substrate, and
forming a continuous layer having a laminated structure on a surface of the hard layer on which the resist pattern has been formed,
the continuous layer having the laminated structure including a continuous layer of a metal oxide directly laminated on the surface of the hard layer on which the resist pattern has been formed, a continuous layer of a metal, and a continuous layer of a metal oxide located on the uppermost surface of the continuous laminated structure,
and further including
forming the pattern layer by removing the resist pattern after the formation of the continuous layer having the laminated structure, thereby peeling off a portion of the continuous layer having the laminated structure that has been formed on the resist pattern.

10. The method for producing an eyeglass lens according to claim 9,
wherein removing the resist pattern includes physical peeling.

11. The method of producing an eyeglass lens according to claim 9, including performing ion cleaning with oxygen ions on the surface of the hard layer on which the pattern layer has been formed.

12. The eyeglass lens according to claim 1, wherein
the first metal oxide layer directly laminated on the surface of the hard layer is a silicon oxide layer, and
the hard layer is a cured layer of a curable composition, the curable composition including a silane compound.

13. The eyeglass lens according to claim 12,
wherein the pattern layer is configured of the first metal oxide layer directly laminated on the surface of the hard layer, a metal layer directly laminated on a surface of the first metal oxide layer directly laminated on the surface of the hard layer, and a metal oxide directly laminated on a surface of the metal layer directly laminated on the surface of the first metal oxide layer.

14. The eyeglass lens according to claim 12,
wherein the metal layer is a metal layer selected from the group consisting of a chromium layer, a molybdenum layer, a tungsten layer, an iron layer, a cobalt layer, a nickel layer, a copper layer, a silver layer, and a gold layer.

15. The eyeglass lens according to claim 12,
wherein the first metal oxide layer directly laminated on the surface of the hard layer is a metal oxide selected from the group consisting of a silicon oxide layer, an aluminum oxide, a cerium oxide, a chromium oxide, a molybdenum oxide, a tungsten oxide, a zirconium oxide, a titanium oxide, a niobium oxide, a tin oxide, and a tantalum oxide.

16. The eyeglass lens according to claim 12,
wherein a thickness of the first metal oxide layer directly laminated on the surface of the hard layer is in the range of 1 nm to 100 nm.

17. The eyeglass lens according to claim 12,
wherein the metal oxide layer located on the uppermost surface of the pattern layer is a metal oxide selected from the group consisting of a silicon oxide, an aluminum oxide, a cerium oxide, a chromium oxide, a molybdenum oxide, a tungsten oxide, a zirconium oxide, a titanium oxide, a niobium oxide, a tin oxide, and a tantalum oxide.

18. The eyeglass lens according to claim 12,
wherein a thickness of the second metal oxide layer located on the uppermost surface of the pattern layer is in the range of 1 nm to 100 nm.

19. An eyeglass comprising the eyeglass lens according to claim 12.

20. A method for producing an eyeglass lens,
wherein the eyeglass lens is the eyeglass lens according to claim 12, and
the method including
forming a resist pattern on a surface of a hard layer provided on a lens substrate, and
forming a continuous layer having a laminated structure on a surface of the hard layer on which the resist pattern has been formed,
the continuous layer having the laminated structure including a continuous layer of a metal oxide directly laminated on the surface of the hard layer on which the resist pattern has been formed, a continuous layer of a metal, and a continuous layer of a metal oxide located on the uppermost surface of the continuous laminated structure,
and further including
forming the pattern layer by removing the resist pattern after the formation of the continuous layer having the laminated structure, thereby peeling off a portion of the continuous layer having the laminated structure that has been formed on the resist pattern.

* * * * *